United States Patent [19]

Mutsers et al.

[11] 4,409,016

[45] Oct. 11, 1983

[54] PROCESS FOR PREPARING THERMALLY STABLE AMMONIUM NITRATE-CONTAINING GRANULES OF HIGH BULK DENSITY

[75] Inventors: Stanislaus M. P. Mutsers, Geleen; Cornelis Hoek, Nieuwstadt; Gerardus M. C. Wagemans, Haelen, all of Netherlands

[73] Assignee: Unie Van Kunstmestfabrieken, B.V., Utrecht, Netherlands

[21] Appl. No.: 390,137

[22] Filed: Jun. 18, 1982

[30] Foreign Application Priority Data

Jun. 19, 1981 [NL] Netherlands .................. 8102958

[51] Int. Cl.$^3$ .................... C05C 1/00; C01C 1/18; C01B 21/48; A01N 25/00
[52] U.S. Cl. ............................... 71/59; 71/58; 71/64.06; 423/267; 423/275; 423/396; 423/397; 23/302 R; 23/313 FB; 427/213
[58] Field of Search .............. 423/396, 267, 275, 397; 71/58, 59, 64.06; 23/302, 313 FB; 427/213

[56] References Cited

U.S. PATENT DOCUMENTS

| | | | |
|---|---|---|---|
| 1,661,203 | 3/1928 | Toniolo | 423/396 |
| 3,231,413 | 1/1966 | Berquin | 23/313 FB |
| 3,379,496 | 4/1968 | Russo | 423/267 |
| 3,630,668 | 12/1971 | Black et al. | 423/396 |
| 4,316,736 | 2/1982 | Van Hijfte et al. | 71/58 X |

FOREIGN PATENT DOCUMENTS

| | | | |
|---|---|---|---|
| 914606 | 8/1958 | United Kingdom | 423/275 |
| 334180 | 12/1968 | U.S.S.R. | 423/396 |

Primary Examiner—Gregory A. Heller

[57] ABSTRACT

A process for preparing thermally stable ammonium nitrate-containing granules having high bulk density, high impact resistance, high crushing resistance, and little or no tendency to cake by spraying a liquid composition containing at most 15% by weight water, a stabilization agent, ammonium nitrate and other components into a fluidized bed of ammonium nitrate seed particles thereby forming granules and recovering the thus formed ammonium nitrate-containing granulated product.

12 Claims, No Drawings

PROCESS FOR PREPARING THERMALLY STABLE AMMONIUM NITRATE-CONTAINING GRANULES OF HIGH BULK DENSITY

BACKGROUND OF THE INVENTION

The invention relates to a process for preparing thermally stable ammonium nitrate-containing granules of high bulk density, from a liquid composition containing a stabilization agent and ammonium nitrate.

Already known processes are described in, for instance, U.S. Pat. No. 3,379,496, and British Pat. No. 1,136,019, which describe the granulation, by the so-called prilling method, of practically water-free ammonium nitrate melts containing a finely divided clay, or magnesium nitrate and/or calcium nitrate stabilizer, respectively.

Disadvantageously, these known prilling processes restrict the maximum particle size of the product. Practically speaking, such processes require substantial capital investment in plant and equipment if relatively large sized product particles are desired. For instance, the preparation of granules having a diameter of more than, say, 3 mm requires the use of very high prilling towers or rapid forced cooling of the falling drops. In view of the increasing demand for larger-diameter granules, especially for application in so-called bulk blends, and of the need for an economically practical process having high flexibility for producing larger sized product particles (e.g. up to 6 mm), a prilling process is less attractive.

Another disadvantage of these processes is that to obtain high-density granules practically water-free melts must be employed.

A process capable of yielding an ammonium nitrate product with a larger particle size is known from Dutch patent application No. 79.02086, which corresponds to U.S. Pat. No. 4,316,736. The latter disclosure is hereby incorporated by reference. According to this process an ammonium nitrate solution containing at most 20% by weight water, more specifically 5% to 10% by weight water, and 0.5% to 3% by weight magnesium nitrate is sprayed onto solid seed particles kept separate from each other while being contacted with a hot current of gas. These particles are at a temperature of between 120° C. and 135° C. In order to obtain thermally stable granules it is necessary to cool the granules at such a slow rate that in the range between 70° and 50° C. they remain virtually homogeneous in temperature.

A disadvantage of this known process is that the finished product has rather a high water content of about 0.3% by weight. Such granules having such a high water content show an increased tendency to cake and have poorer hygroscopic behavior during storage. In general this makes it necessary to apply a rather large quantity of a coating agent to the particles. In addition, such a product can hardly be stored or shipped in bulk. Instead, closed moisture proof bags have to be used in shipping the product.

Another disadvantage of this process is that the granules need to be cooled slowly in the 70° C. to 50° C. range, so that for a given quantity of product a relatively large size cooling unit is needed. Further, this cooling method requires the use of several, in general three, discrete cooling stages such as one for cooling down to 70° C., one for the 70° C. to 50° C. range, and one for cooling below 50° C. Finally, this known process has the disadvantage that its flexibility, measured in terms of the quantity of recycle material, and hence of production capacity, is limited by the narrow temperature range required for the bed of seed particles.

The present invention provides a process which essentially avoids and overcomes the drawbacks in the above mentioned processes.

According to the present invention, this is achieved by using an ammonium nitrate-containing liquid composition or solution having at most about 15% by weight water, about 0.3% weight to about 3.5% weight calcium nitrate and about 0.5% weight to about 5% weight of a thermal stabilization agent, which weight percents are calculated in relation to the quantity of ammonium nitrate, and spraying such a liquid composition (or solution) into or onto a bed of ammonium nitrate-containing seeds which are kept separate from each other and are contacted with a gas current to form product granules. The ammonium nitrate containing seeds have a temperature of between 95° C. and 145° C. The resulting product granules are discharged from the bed.

With the process according to the invention a granular product is obtained which possesses high thermal stability and a high bulk density, for instance greater than about 950 g/l, while also having an extremely low water content, such as less than 0.1% weight. More particularly the water content is less than about 0.05% weight. In addition, the granular product produced according to the present process exhibits excellent impact resistance and crushing strength. Unlike the granules produced by the above-mentioned known processes, granules produced according to the present process hardly cake together, and exhibit hardly any hygroscopicity.

In addition in the present invention, it is unnecessary to employ slow cooling such as between 70° C. and 50° C. as described in U.S. Pat. No. 4,316,736. Therefore in the present invention, rapid cooling methods can be employed, for instance fluid-bed cooling, which allows an economization in cooling equipment. It has been found that the rapid cooling of the granules results in a product having increased bulk density.

The process according to the invention may start from a practically or substantially water-free ammonium nitrate melt, as well as from an ammonium nitrate-containing composition or solution. As will be understood, the present invention is not restricted to practically water-free melts.

If an ammonium nitrate-containing liquid composition having a high water content, such as over 5% by weight and more particularly from about 5% to about 10% by weight, is sprayed into or onto the seed bed, then a seed bed temperature of over about 115° C. is employed, advantageously a bed temperature of about 120° C. to about 140° C. is used. An advantage of this mode of realizing the invention is that a less concentrated feed can be employed which translates into a substantial cost savings in for example, the expense of evaporation. If a liquid composition having a low water content, such as lower than about 3% by weight, either a high bed temperature or a low bed temperature may be used. More particularly, a liquid composition having a water content less than about 1% by weight can be employed. With lower water content compositions the bed temperature is advantageously between about 95° C. to about 115° C., or even more particularly from 100° C. to about 110° C., because it is then unnecessary to preheat the fluidization gas.

Preferably, the amount of calcium nitrate contained in the liquid composition is about 0.5% to about 1.0% by weight, calculated in relation to the quantity of ammonium nitrate. The calcium nitrate can be added as such to the ammonium nitrate-containing solution or melt. It is also possible to add calcium oxide, or a calcium salt reacting in situ while forming calcium nitrate, to the nitric acid used for preparation of ammonium nitrate or to the ammonium nitrate obtained therefrom after ammoniation and possibly, evaporation.

A thermal stabilization agent may be selected from among any of the various known agents that are inert to ammonium nitrate. The present invention is therefore not dependent on the thermal stabilization agent employed. Various suitable thermal stabilizing agents are described in U.S. Pat. No. 3,379,496, the disclosure of which is hereby incorporated by reference.

Advantageously, a finely divided silica-containing material which is insoluble in and chemically inert with respect to ammonium nitrate can be used. In particular, a silica-containing clay having a particle size smaller than 10 microns and more particularly smaller than 5 microns can be advantageously employed. Such products have been described in U.S. Pat. No. 3,379,496, the disclosure of which is hereby incorporated by reference. Commercially available silica containing clays are suitable, such as, for example only, Sorbolite from Tennessee Mining and Chemical Corp. This material may be added to the ammonium nitrate-containing melt as well as to a liquid composition or solution of ammonium nitrate before either the melt or solution (liquid composition) is subjected to evaporation. By preference, about 1.5% to about 2.5% by weight of the silica-containing material, calculated in relation to the ammonium nitrate, is added.

If desired, the temperature of the composition to be sprayed may be varied. Advantageously the temperature is at least 5° C. above the crystallization temperature of the composition. In general, the maximum temperature should be lower than that at which the composition boils at atmospheric pressure. For safety reasons, temperatures above about 180° C. are avoided. For instance, if use is made of a 95% by weight solution, a temperature of between 125° C. and 170° C. is employed, and with a 99.5% by weight solution a temperature of between 165° C. and 180° C. is used.

The solution is sprayed in a known way onto the bed, e.g. by means of a single-phase spray, or, by preference, with a strong current of a hot gas into the bed, for instance by means of a two-phase spray. The spraying gas, for example, air, is supplied at a temperature that is about equal to or slightly lower than the temperature of the composition to be sprayed. Any other inert spray gases may be used. The quantity of spraying gas may vary. Advantageously, the amount of gas applied is such that in the spraying unit the gas-to-liquid composition mass ratio is about 1:1 to about 1:4.

The bed of seeds which are kept separate from each other while maintained in contact with a gas current may be in the form of a fluidized bed or a spouted bed. In addition of bed of seeds obtained by application of the so-called spherodizer technique can be employed. The process has special application to fluid-bed granulation. In particular, the fluidization gas is applied in the form of a current of air passing through the bed of seeds from bottom to top, and the liquid ammonium nitrate-containing composition can be sprayed from the bottom upward into the seed bed.

The amount of fluidization gas employed may vary, but should be at least so large a volume and have such a velocity that all seed particles in the bed are kept fluidized. By preference, the superficial velocity of the fluidized gas is about twice the minium fluidization velocity (MFV). MFV means the minimum velocity of the fluidizing gas that suffices to support the weight of the seed particles suspended in the bed. For example, using ammonium nitrate with a mean particle size of 3 mm, the MFV is about 1.2 m/sec. The appropriate velocity can readily be determined by those skilled in the art by simple experiment with a given particle size. However the velocity of the fluidization gas must be less than that which would blow the individual seed particles out of the bed. That is, the seeds are suspended in but not entrained in the fluidization gas so as to flow out of the reaction container.

The temperature of the fluidization gas may vary, for instance between 20° C. and 170° C. In general, the applied temperature in combination with the seed temperature and seed quantity establishes the desired bed temperature. Suitable fluidization gas temperatures can be determined without difficulty.

The seeds may, in principle, consist of any ammonium nitrate particles that contain calcium nitrate and a stabilization agent. By preference, the granules obtained by processing the product from the bed are employed. Optionally after cooling, this product can be screened in a known way. The oversize granules are crushed and then advantageously, returned to the bed as seed particles along with the undersize granules. Depending on the amount of seeds required, part of the granules may if desired be recycled. The remaining seeds may for instance, be added to the liquid ammonium nitrate feed, either directly or after melting. Should there be too small an amount of granules for recycling, it is possible also to return part of the product granules, after crushing if necessary.

The amount of recycle material may vary. It has been found that in the present process it is always sufficient to work with a quantity equal to the amount of the liquid composition fed in. By preference, such a quantity of recycle material is used that the weight ratio of recycle material to liquid composition is about 1:1 to about 1:2.

The size of the seeds introduced into the bed may likewise vary. Advantageously, the mean diameter of the seeds is between 0.75 mm and 2.0 mm.

The height of the bed may vary. In the case of a fluidized bed a height of about 0.5 meter to about 1 meter is the most common dimension range.

The temperature of the seeds in the bed is between about 95° C. to about 145° C. This temperature is controlled with the aid of the temperature of the fluidizing gas being passed through the fluidized bed and by controlling the temperature of the seeds being fed in, such as for example the temperature of the recycle material.

If a seed bed temperature in the higher part of the range between 95° C. and 145°, such as about 120° C. to about 140° C., is desired it is preferable to preheat the fluidizing gas prior to introduction thereto, and/or not to cool the granules discharged from the bed before screening. Also the temperature of the recycle material may be used in controlling the temperature by cooling or not cooling the recycle material. The pre-heating of the fluidizing gas may be effected through a heat exchange with the product granules after screening. A high bed temperature is advantageous, especially when a highly concentrated ammonium nitrate feed is used, since a better heat balance can be maintained in the process because no cooling of the recycle material is required.

If a relatively low bed temperature is desired, for instance about 100° C. to about 110° C., it is possible, depending on the water content of the ammonium nitrate feed, to employ relatively cold fluidizing gas and/or to cool either the granules discharged from the bed prior to screening or to cool the recycle material.

The granules obtained in the bed are preferably continuously discharged from the bed, for instance via the the bottom of the process vessel or via an overflow.

Subsequently the granular product can be screened at once to obtain a product fraction with the desired grain sizes and a larger and a smaller fraction, after which the product fraction is cooled down to the ambient temperature. It is also possible first to cool the granules discharged from the bed, for instance down to a temperature between the granulation and the ambient temperature, followed by screening the granular product, and, if necessary, to further cool the thus obtained product fraction.

The cooling of the granules can be effected by means of several known cooling methods. By preference, the cooling is effected in one or more fluid-bed coolers. This applies to the granules prior to screening as well as to the product granules granules after screening. As indicated earlier, this offers the advantage that relatively limited cooling equipment is sufficient.

Moreover it has been found that rapid cooling of the granules in the process according to the present invention results in product of increased bulk density, while—in contrast with the product obtained in the process according to U.S. Pat. No. 4,316,736—no deterioration of the thermal stability occurs.

By preference, conditioned air at ambient temperature or at a slightly higher temperature is used as fluidization gas in the fluid-bed cooler(s). Advantageously, the heated air leaving the cooler can be used as the fluidization gas for the seed bed.

The air issuing from the bed of seed particles contains, besides water vapor, a small quantity of ammonium nitrate-containing dust. The dust can be removed in a known way, for instance by washing with water or with a dilute ammonium nitrate-containing solution which is then recirculated.

If desired, the product granules obtained after screening and cooling can be further treated with a coating agent in any known way. The moisture content of the product obtained is so low that a drying stage can be omitted. The granules may be subjected to a further regular, rolling motion in a rotary drum, so as to effect an additional rise of the bulk density. This is preferably performed before the cooling, particularly at a substantially constant temperature which is equal to or at most 10° C. lower than the temperature of the fluidized granulation bed. The residence time in the rotary drum may vary between 1 and 10 minutes and is preferably between 2 and 5 minutes. Advantageously, no air is passed through the rotary drum to avoid evaporation of water and cooling of the granules. An additional advantage obtained by this treatment is that the roundness of the granules is improved and hence the flowability of the product.

Although the present process has special importance for the preparation of ammonium nitrate granules, it can also be advantageously used for preparing granules containing other components besides ammonium nitrate, for instance fillers, such as marlstone or dolomite, plant nutrient, trace elements, various known agrochemicals such as, for example only, herbicides and the like as well as various known fertilizer salts.

The invention will now be further elucidated in the following non-limiting examples which serve to illustrate various embodiments of the present invention.

EXAMPLES

EXAMPLE 1

To a circular fluid-bed granulator (diameter 45 cm) with a perforated bottom, containing a bed of $NH_4NO_3$ seed particles having a mean diameter 2.95 mm a $NH_4NO_3$ melt was continuously supplied via a two-phase spray by means of a strong air current and sprayed laterally into the bed. The bed height was 40 cm. To the melt 0.5% by weight of finely divided calcium carbonate and 2% weight of a silica-containing clay had been added. The clay used was a product which can be obtained under the name of Sorbolite from Tennessee Mining and Chemical Corp. Sorbolite contains mainly $SiO_2$ (72.7%) and $Al_2O_3$ (13.6%) besides small quantities of $K_2O$ (0.5%), $CuO$ (1.5%), $TiO_2$ (0.6%), $Fe_2O_3$ (2.9%), $MgO$ (0.8%). The balance of the Sorbolite is organic material. The bed (135° C.) was fluidized by means of an upward air current supplied through the bottom plate of the fluid bed granulator. Granules were continuously discharged through an overflow onto a screen and separated into a fine fraction of granules having diameters less than 2 mm, a product fraction of granules having diameters of about 2 mm to about 4 mm and a course fraction wherein the granules have diameters in excess of 4 mm. The coarse fraction was crushed on crusher rollers and was continuously recycled to the bed together with the fine fraction.

The product fraction was rapidly cooled in a fluid-bed cooler to about 35° C. Part of this product was heated and cooled five times between 15° and 50° C.

The process conditions and the properties of the product obtained and of the product after five cycles are set forth in Table I below.

EXAMPLE 2 THROUGH 6

In the same manner as in Example 1, a liquid $NH_4NO_3$-containing composition was granulated in a fluidized bed of seed particles. The results are also listed in Table I.

TABLE I

| Example | 1 | 2 | 3 | 4 | 5 | 6 |
|---|---|---|---|---|---|---|
| Process Conditions | | | | | | |
| Bed temperature (°C.) | 135 | 120 | 105 | 128 | 138 | 128 |
| H<sub>2</sub>O content NH<sub>4</sub>NO<sub>3</sub> feed (% wt.) | 0.42 | 0.42 | 0.42 | 0.54 | 5.29 | 4.80 |
| Temp. of NH<sub>4</sub>NO<sub>3</sub> feed (°C.) | 176 | 173 | 170 | 171 | 145 | 165 |
| Quantity of NH<sub>4</sub>NO<sub>3</sub> feed (kg/h) | 95 | 95 | 95 | 95 | 49 | 49 |
| Temp. of spraying air (°C.) | 161 | 161 | 159 | 158 | 153 | 153 |
| Quantity of spraying air (kg/h) | 80 | 80 | 80 | 75 | 81 | 84 |
| Temp. of fluidization air (°C.) | 152 | 122 | 105 | 126 | 140 | 130 |

TABLE I-continued

| Example | 1 | 2 | 3 | 4 | 5 | 6 |
|---|---|---|---|---|---|---|
| Quantity of fluidization air (kg/h) | 1180 | 1180 | 1180 | 1180 | 1180 | 1180 |
| Velocity of fluidization air (m/s) | 2.63 | 2.53 | 2.44 | 2.59 | 2.65 | 2.63 |
| Quantity of $CaCO_3$ (% wt.) | 0.5 | 0.5 | 0.5 | 0.5 | 0.5 | 0.5 |
| Quantity of clay (% wt.) | 2 | 2 | 2 | 2 | 2 | 2 |
| Product quality | | | | | | |
| Nitrogen content (% wt.) | 33.80 | 33.85 | 33.70 | 33.80 | 33.80 | 34.00 |
| $H_2O$ content (% wt.) | 0.02 | 0.05 | 0.05 | 0.05 | 0.10 | 0.07 |
| Bulk density (g/l) | 955 | 955 | 965 | 950 | 946 | 945 |
| Rolling capacity (% round) | 50 | 90 | 60 | 95 | 75 | 70 |
| Impact resistance (%) | 100 | 100 | 100 | 100 | 100 | 100 |
| Crushing strength (bar) | 25 | 65 | 65 | 30 | 40 | 45 |
| Oil-absorption cap. (% wt.) | 0.30 | 0.20 | 0.20 | 0.50 | 0.20 | 0.40 |
| $D_{50}$ (mm) | 2.95 | 3.15 | 3.50 | 3.35 | 2.65 | 2.30 |
| Mercury penetration ($cm^3/g$) | 0.040 | 0.028 | 0.031 | 0.038 | 0.035 | 0.038 |
| Product after 5 cycles between 15° and 50° C. | | | | | | |
| Crushing strength (bar) | 25 | 45 | 65 | 30 | 40 | 45 |
| Oil-absorption cap. (% wt.) | 0.55 | 0.95 | 0.80 | 0.50 | 0.30 | 0.60 |
| Volume increase (%) | 0 | 5 | 5 | 0 | 2 | 3 |

What is claimed is:

1. A process for preparing thermally stable ammonium nitrate-containing granules of high bulk density from a composition containing a stabilization agent and ammonium nitrate, comprising the combination of steps of:
   (a) forming a fluidized bed of ammonium nitrate seeds kept separated from each other while being contacted by and suspended within a gas current, said fluidized bed being fluidized with air flowing through said bed from bottom to top at a superficial velocity about twice the minimum fluidizaton velocity;
   (b) spraying a liquid composition composed of ammonium nitrate and containing:
      (i) at most about 15% by weight water,
      (ii) about 0.3% to about 3.5% by weight calcium nitrate, and
      (iii) about 0.5% to about 5.0% by weight of a thermal stabilization agent wherein said stabilization agent is a finely divided silica-containing material which is insoluble in and chemically inert to ammonium nitrate
   into said seed bed while said bed is maintained at a temperature of between about 95° C. to about 145° C. whereby granules are thereby formed and then discharged from said seed bed; and
   (c) recovering and rapidly cooling the thus formed granules discharged from said seed bed.

2. Process according to claim 1, wherein said liquid composition is a melt which includes at most about 3% weight water.

3. Process according to claim 2, wherein said bed temperature is between about 95° C. to about 115° C.

4. Process according to any one of claims 1, 2 or 3 wherein said liquid composition contains at most about 1% by weight water and said bed temperature is maintained about 100° C. to about 110° C.

5. Process according to claim 1, wherein said liquid composition is a solution which has more than about 5% by weight water and said solution is sprayed into said bed while said bed is at a temperature higher than about 115° C.

6. Process according to claim 5, wherein said solution includes about 5% to about 10% weight water and said bed is maintained at a temperature of about 120° C. to about 140° C.

7. Process according to claim 1, wherein said agent is a silica-containing clay with a particle size of less than 10μ.

8. Process according to any one of claims 1 or 7, wherein said liquid composition includes about 0.5% to about 1.0% by weight calcium nitrate and about 1.5% to about 2.5% by weight of said silica-containing material.

9. Process according to any one of claims 1 or 7 wherein said liquid composition is used at a temperature at least 5° C. higher than the crystallization temperature of said composition.

10. Process according to claim 1, wherein said liquid composition is sprayed into the bed of seed particles by means of an air current, which is at a temperature about equal to that of said composition and at an air to liquid composition mass ratio of between about 1:1 and about 1:4.

11. Process according to claim 1, wherein said cooling is effected in one or more fluid-bed coolers.

12. Process according to claim 11, wherein the gas issuing from the fluid-bed cooler is least partly used as said gas current.

* * * * *